United States Patent
Jiang et al.

(10) Patent No.: US 9,508,134 B2
(45) Date of Patent: Nov. 29, 2016

(54) APPARATUS, SYSTEM, AND METHOD FOR ENHANCING IMAGE DATA

(71) Applicant: The Boeing Company, Chicago, IL (US)

(72) Inventors: Qin Jiang, Oak Park, CA (US); Yuri Owechko, Newbury Park, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/657,932

(22) Filed: Mar. 13, 2015

(65) Prior Publication Data

US 2016/0267632 A1 Sep. 15, 2016

(51) Int. Cl.
  *G06T 5/20* (2006.01)
  *G06T 5/00* (2006.01)
  *G06T 5/40* (2006.01)

(52) U.S. Cl.
  CPC .............. *G06T 5/20* (2013.01); *G06T 5/002* (2013.01); *G06T 5/003* (2013.01); *G06T 5/009* (2013.01); *G06T 5/40* (2013.01); *G06T 2207/20024* (2013.01); *G06T 2207/20182* (2013.01); *G06T 2207/20192* (2013.01); *G06T 2207/20208* (2013.01)

(58) Field of Classification Search
  CPC .......... G06T 5/20; G06T 5/40; G06T 5/003; G06T 2207/10116; G06T 7/0012; G06T 2207/20064; G06T 5/002; G06T 2207/20192; G06T 2207/30004; G06T 2207/30061; G06T 5/008; G06T 2207/20148; G06T 2207/10024
  See application file for complete search history.

(56) References Cited

U.S. PATENT DOCUMENTS

| | | | | |
|---|---|---|---|---|
| 5,526,446 | A * | 6/1996 | Adelson | G06K 9/40 382/260 |
| 5,892,850 | A * | 4/1999 | Tsuruoka | G06F 17/148 382/240 |
| 6,801,672 | B1 * | 10/2004 | Thomas | G06T 5/10 382/167 |

(Continued)

OTHER PUBLICATIONS

Karthikeyan et al., Wavelet-based Image Enhancement Techniques for Improving Visual Quality of Ultrasonic Images, International Journal of Computer Applications, Feb. 2012, p. 49-53, vol. 39, No. 17.

*Primary Examiner* — Jingge Wu
(74) *Attorney, Agent, or Firm* — Kunzler Law Group, PC

(57) ABSTRACT

Described herein is a method for enhancing image data that includes transforming image data from an intensity domain to a wavelet domain to produce wavelet coefficients. A first set of wavelet coefficients of the wavelet coefficients includes low-frequency wavelet coefficients. The method also includes modifying the first set of wavelet coefficients using a coefficient distribution based filter to produce a modified first set of wavelet coefficients. The method includes transforming the modified first set of wavelet coefficients from the wavelet domain to the intensity domain to produce enhanced image data.

19 Claims, 12 Drawing Sheets

(56) References Cited

U.S. PATENT DOCUMENTS

| | | | |
|---|---|---|---|
| 7,068,328 B1* | 6/2006 | Mino | G06T 5/009 348/437.1 |
| 7,151,858 B2* | 12/2006 | Kyong | G06T 5/003 382/261 |
| 8,023,760 B1 | 9/2011 | Buck et al. | |
| 8,149,245 B1 | 4/2012 | Buck et al. | |
| 2003/0099405 A1* | 5/2003 | Avinash | G06T 5/002 382/260 |
| 2004/0008904 A1* | 1/2004 | Lin | G06K 9/40 382/275 |
| 2005/0181399 A1* | 8/2005 | Okimoto | G01N 33/6803 435/6.16 |
| 2005/0197567 A1* | 9/2005 | Qian | G06T 7/0012 600/425 |
| 2008/0298642 A1* | 12/2008 | Meenen | G06K 9/00 382/115 |
| 2009/0226087 A1* | 9/2009 | Aragaki | H04N 5/357 382/167 |
| 2010/0226590 A1* | 9/2010 | Yoo | G06T 5/002 382/275 |
| 2012/0257164 A1* | 10/2012 | Zee | A61B 3/12 351/206 |

* cited by examiner

APPARATUS, SYSTEM, AND METHOD FOR ENHANCING IMAGE DATA

FIELD

This disclosure relates generally to image sensing, and more particularly to enhancing sensed image data.

BACKGROUND

Some image sensors are used to obtain image data by perceiving objects in day and/or night settings. The clarity of the image data may be affected by environmental factors such as fog, haze, sand-brownouts, smoke, rain, snow, steam, and so forth. Unclear image data may be difficult to use.

SUMMARY

The subject matter of the present application has been developed in response to the present state of the art, and in particular, in response to shortcomings of conventional image processing techniques. For example, conventional image processing techniques do not provide sufficient image clarity under certain conditions, such as in degraded visibility environments where visibility is degraded due to fog, haze, sand-brownouts, smoke, rain, snow, steam, and so forth.

Accordingly, the subject matter of the present application has been developed to provide an image enhancing apparatus, system, and method that overcome at least some of the above-discussed shortcomings of prior art techniques. More particularly, in some embodiments, described herein are apparatuses, systems, and methods for enhancing image data by modifying the wavelet coefficients computed from the image data.

According to one embodiment, a method of enhancing image data includes transforming image data from an intensity domain to a wavelet domain to produce wavelet coefficients. A first set of wavelet coefficients of the wavelet coefficients includes low-frequency wavelet coefficients. The method also includes modifying the first set of wavelet coefficients using a coefficient distribution based filter to produce a modified first set of wavelet coefficients. The method includes transforming the modified first set of wavelet coefficients from the wavelet domain to the intensity domain to produce enhanced image data.

In one implementation of the method, transforming the image data from the intensity domain to the wavelet domain includes using one or more low-pass filters and one or more high-pass filters to filter the image data.

In yet one implementation of the method, transforming the image data from the intensity domain to the wavelet domain includes decimating the image data.

According to one implementation of the method, modifying the first set of wavelet coefficients using the coefficient distribution based filter includes partitioning the first set of wavelet coefficients into regions, calculating a coefficient distribution for each region, modifying the coefficient distribution for each region, forming a coefficient transformation function for each region, and modifying the first set of wavelet coefficients using the coefficient transformation functions.

In one implementation of the method, calculating the coefficient distribution for each region includes computing a histogram for each region and normalizing the histogram for each region.

In yet one implementation of the method, modifying the coefficient distribution for each region includes using a threshold value to limit a distribution peak of the coefficient distribution for each region and redistributing a number of coefficients limited by the distribution peak.

According to one implementation of the method, modifying the first set of wavelet coefficients using the coefficient transformation functions includes, for each wavelet coefficient of the first set of wavelet coefficients, using at least two coefficient transformation functions each corresponding to a respective central point of at least two regions. The at least two central points are the closest central points to the wavelet coefficient.

In one implementation of the method, using the at least two coefficient transformation functions includes using a weight factor for each of the at least two coefficient transformation functions. Each weight factor is calculated based on a distance between a position of the wavelet coefficient and a position of one of the at least two central points.

In yet one implementation of the method, a second set of wavelet coefficients of the wavelet coefficients includes high-frequency wavelet coefficients.

According to one implementation of the method, the method includes modifying the second set of wavelet coefficients to enhance image edges and remove noise and to produce a modified second set of wavelet coefficients.

In one implementation of the method, transforming the modified first set of wavelet coefficients from the wavelet domain to the intensity domain includes using one or more low-pass filters and one or more high-pass filters to filter the modified first set of wavelet coefficients, and interpolating the modified first set of wavelet coefficients.

In yet one implementation of the method, the method includes filtering the image data to convert data into a predetermined dynamic range using a histogram of the image data before transforming the image data from the intensity domain to the wavelet domain.

According to one implementation of the method, the image data includes infrared data captured by an infrared sensor.

In one implementation of the method, the method includes removing blocking artifacts from the enhanced image data using a smoothing filter.

In another embodiment, a mobile platform includes a sensor configured to detect an image and to produce image data associated with the image. The mobile platform also includes a processor operatively coupled to the sensor and configured to receive the image data. The mobile platform includes a memory that stores code executable by the processor. The code includes code that transforms the image data from an intensity domain to a wavelet domain to produce first, second, third, and fourth sets of wavelet coefficients. The first set of wavelet coefficients include low-frequency wavelet coefficients, and the second, third, and fourth sets of wavelet coefficients include high-frequency wavelet coefficients. The code also includes code that modifies the first set of wavelet coefficients using a coefficient distribution based filtering to produce a modified first set of wavelet coefficients. The code includes code that modifies the second, third, and fourth sets of wavelet coefficients to enhance image edges (e.g., remove noise) and to produce modified second, third, and fourth sets of wavelet coefficients. The code also includes code that transforms the modified first, second, third, and fourth sets of wavelet coefficients from the wavelet domain to the intensity domain to produce enhanced image data.

According to one implementation, the image sensor includes an infrared image sensor.

In one implementation, the mobile platform includes a display device operatively coupled to the processor and configured to display the enhanced image data.

In yet another embodiment, an apparatus includes a wavelet transformation module that transforms image data from an intensity domain to a wavelet domain to produce wavelet coefficients. A first set of wavelet coefficients of the wavelet coefficients includes low-frequency wavelet coefficients, and a second set of wavelet coefficients of the wavelet coefficients includes high-frequency wavelet coefficients. The apparatus also includes a low-frequency wavelet coefficient modification module that modifies the first set of wavelet coefficients using a coefficient distribution based filter to produce a modified first set of wavelet coefficients. The apparatus includes a high-frequency wavelet coefficient modification module that modifies the second set of wavelet coefficients to enhance image edges and to produce a modified second set of wavelet coefficients. A modified plurality of wavelet coefficients includes the modified first and second sets of wavelet coefficients. The apparatus also includes an inverse wavelet transformation module that transforms the modified plurality of wavelet coefficients from the wavelet domain to the intensity domain to produce enhanced image data. The apparatus includes a post-filter module that removes blocking artifacts from the enhanced image data using a smoothing filter. At least one of the wavelet transformation module, the low-frequency wavelet coefficient modification module, the high-frequency wavelet coefficient modification module, the inverse wavelet transformation module, and the post-filter module includes one or more of hardware and executable code. The executable code is stored on one or more non-transitory computer readable storage media.

According to one implementation, the high-frequency wavelet coefficient modification module modifies the second set of wavelet coefficients to enhance image edges and to produce a modified second set of wavelet coefficients by estimating a dynamic range of the second set of wavelet coefficients, removing noisy data points by limiting each wavelet coefficient of the second set of wavelet coefficients to a threshold, and enhancing each wavelet coefficient of the second set of wavelet coefficients indicative of object edges.

In one implementation, the apparatus includes a pre-filter module that filters the image data before the first transformation module transforms the image data from the intensity domain to the wavelet domain by forming an image histogram using the image data, calculating an image content range using the image histogram, and converting the image data into reduced dynamic range image data using the image content range.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter, they are not therefore to be considered to be limiting of its scope. The subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
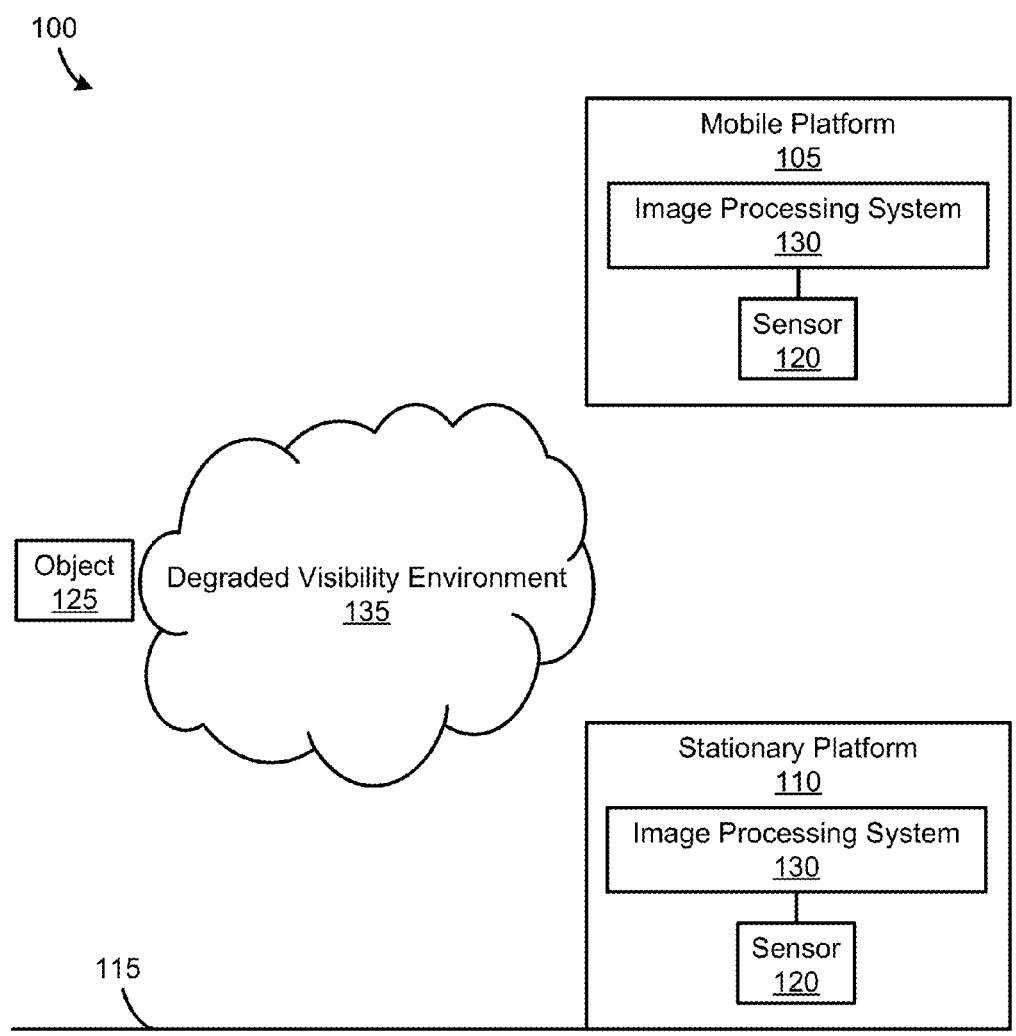
FIG. 1 is a schematic diagram of an environment in which image data may be received and/or processed according to one embodiment.

Referring to FIG. 1, and according to one embodiment, an environment 100 in which image data may be received and/or processed is illustrated. In the illustrated environment 100, a mobile platform 105 and/or a stationary platform 110 may be used to receive and/or process image data. In certain embodiments, the mobile platform 105 may be an aircraft such as an airplane, a helicopter, a jet, a drone, and so forth flyable above a ground surface 115. In other embodiments, the mobile platform 105 may be a rocket, a satellite, a missile, and so forth. Moreover, in some embodiments, the stationary platform 110 may be part of a ground surveillance system positioned on the ground surface 115.

Both the mobile platform 105 and the stationary platform 110 may include a sensor 120 used to detect or capture optical images of objects, such as an object 125, and to convert the optical images of objects into image data associated with the images. As may be appreciated, the sensor 120 may be any suitable image sensor, such as an infrared (IR) sensor, a semiconductor charge-coupled device (CCD), an active pixel sensor, and so forth. The image data associated with the images may be produced and/or provided to another device. For example, in the illustrated embodiment, the sensor 120 may provide the image data to an image processing system 130 to process the image data and/or to enhance the quality of the image data. As illustrated, an imaging system 135 includes the sensor 120 and the image processing system 130.

As illustrated, a degraded visibility environment 140 may block the sensor 120 from sensing a clear image of the object 125, thus resulting in degraded image data. The degraded visibility environment 140 may be any type of environment that reduces the quality of the sensed image obtained from the sensor 120. For example, the degraded visibility environment 140 may include fog, haze, sand-brownout, smoke, rain, snow, steam, and so forth. The image processing system 130 may be used to enhance the quality of the image data obtained while the degraded visibility environment 140 is present. The object 125 may be located within or adjacent to the degraded visibility environment 140. Similarly, the mobile platform 105 and stationary platform 110 also may be located within or adjacent to the degraded visibility environment 140.

The image processing system 130 may be used to enhance image data by transforming image data from an intensity domain to a wavelet domain to produce wavelet coefficients. The wavelet coefficients may include low-frequency wavelet coefficients and high-frequency wavelet coefficients. The image processing system 130 may modify the wavelet coefficients using a coefficient distribution based filter to produce modified wavelet coefficients. Furthermore, the image processing system 130 may transform the modified wavelet coefficients from the wavelet domain to the intensity domain to produce enhanced image data. Accordingly, the image processing system 130 may produce enhanced image data from the degraded image data obtained by the sensor 120.

Figure 2:
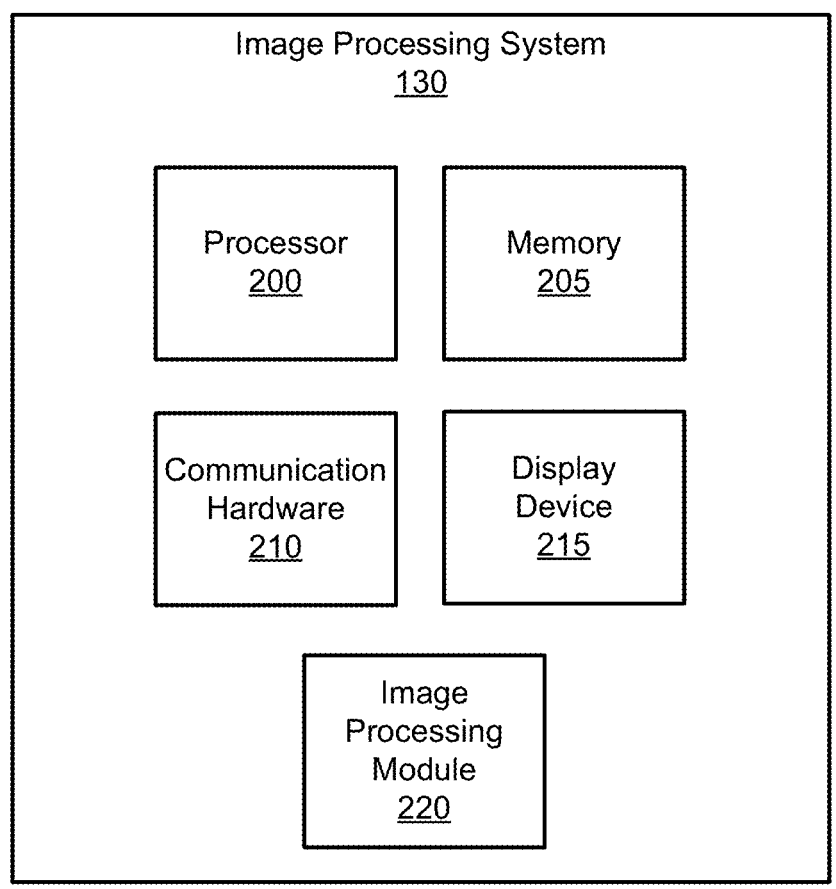
FIG. 2 is a schematic block diagram of an image processing system according to one embodiment.

FIG. 2 is a schematic block diagram of an embodiment of the image processing system 130. The image processing system 130 includes a processor 200, memory 205, communication hardware 210, a display device 215, and an image processing module 220. The memory 205 may be a semiconductor storage device, a hard disk drive, an optical storage device, a micromechanical storage device, or combinations thereof. Furthermore, the memory 205 may store code and the processor 200 may be used to execute the code. In certain embodiments, the processor 200 may be operatively coupled to the sensor 120 and configured to receive image data from the sensor 120. Moreover, the communication hardware 210 may communicate with other devices. The display device 215 may be operatively coupled to the processor 200 and used to display data, such as image data and/or enhanced image data. The image processing module 220 may include various modules used to enhance image data received from the sensor 120.

In certain embodiments, the memory 205 may store code that transforms image data from an intensity domain to a wavelet domain to produce first, second, third, and fourth sets of wavelet coefficients. The first set of wavelet coefficients may include low-frequency coefficients, while the second, third, and fourth sets of wavelet coefficients may include high-frequency wavelet coefficients. The memory 205 may also store code that modifies the first set of wavelet coefficients using a coefficient distribution based filtering to produce a modified first set of wavelet coefficients. Furthermore, the memory 205 may contain code that modifies the second, third, and fourth sets of wavelet coefficients to enhance image edges and to produce modified second, third, and fourth sets of wavelet coefficients. Moreover, the memory 205 may contain code that transforms the modified first, second, third, and fourth sets of wavelet coefficients from the wavelet domain to the intensity domain to produce enhanced image data.

Figure 3:
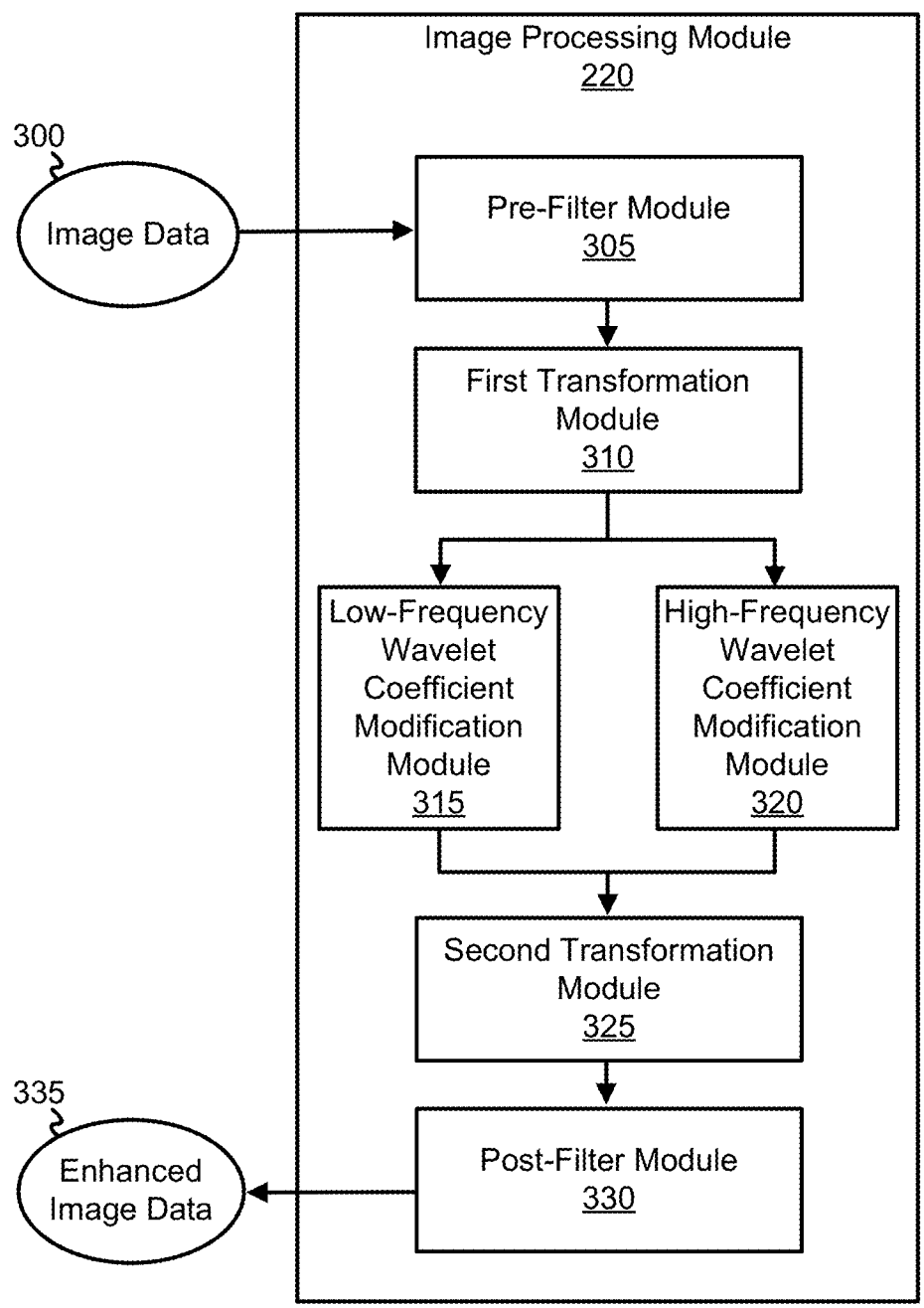
FIG. 3 is a schematic block diagram of an image processing module according to one embodiment.

FIG. 3 is a schematic block diagram of one embodiment of the image processing module 220. The image processing module 220 receives image data 300, such as image data produced by the sensor 120. A pre-filter module 305 receives the image data 300 and filters the image data, such as by using a dynamic range filter. A wavelet transformation module 310 receives the image data 300 that has been filtered by the pre-filter module 305 and transforms the image data 300 from an intensity domain to a wavelet domain to produce multiple wavelet coefficients. The multiple wavelet coefficients include a first set of wavelet coefficients that are low-frequency wavelet coefficients, and a second set of wavelet coefficients that are high-frequency wavelet coefficients.

A low-frequency wavelet coefficient modification module 315 receives the first set of wavelet coefficients and modifies the first set of wavelet coefficients using a coefficient distribution based filter to produce a modified first set of wavelet coefficients. Moreover, a high-frequency wavelet coefficient modification module 320 receives the second set of wavelet coefficients and modifies the second set of wavelet coefficients to enhance image edges and to produce a modified second set of wavelet coefficients. An inverse wavelet transformation module 325 transforms the modified first and second sets of wavelet coefficients from the wavelet domain to the intensity domain to produce enhanced image data 335. Furthermore, a post-filter module 330 removes blocking artifacts from the enhanced image data 335 using a smoothing filter. The enhanced image data 335 is output from the image processing module 220.

The post-filter module 330 may remove blocking artifacts introduced into the enhanced image data 335 using a smoothing filter, such as a Gaussian filter calculated using Equation 1.

$$H(x, y) = A\exp\left\{-\left[\frac{(x-x_0)^2}{2\sigma_x^2} + \frac{(y-y_0)^2}{2\sigma_y^2}\right]\right\} \quad \text{Equation 1}$$

The constant A is a normalization constant and $(x_0, y_0)$ is the center of the filter. The variances, $\sigma_x$ and $\sigma_y$, are used to control the smoothing effect. In general, a smaller value in the variances generates less smoothing effect.

Figure 4:
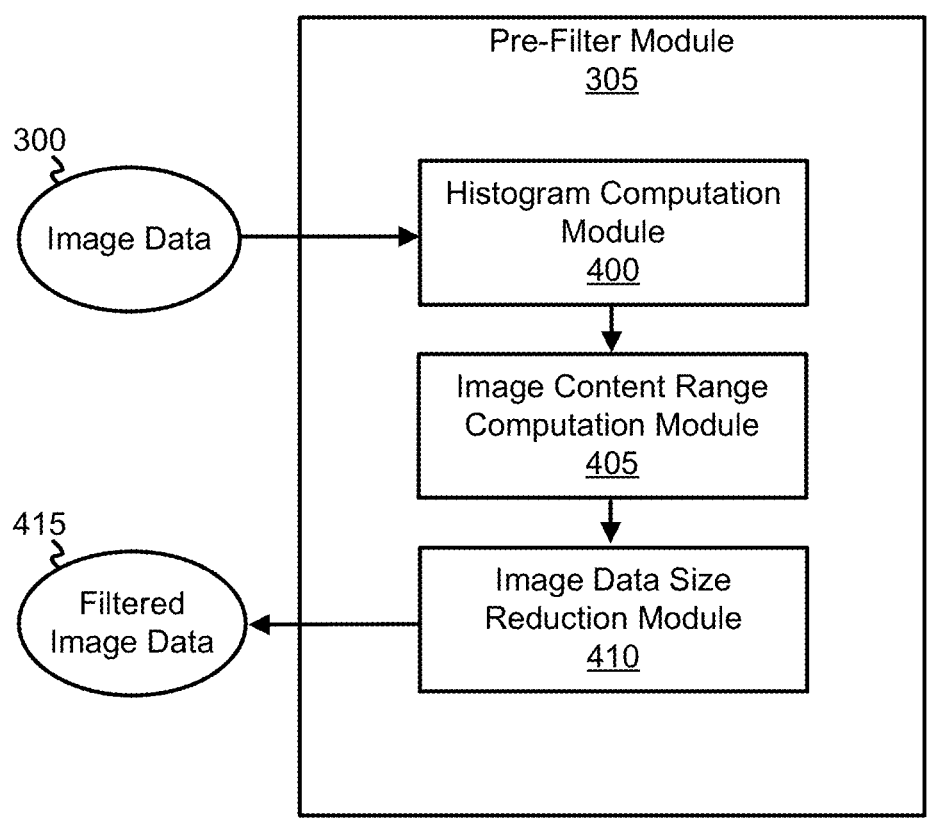
FIG. 4 is a schematic block diagram of a pre-filter module according to one embodiment.

FIG. 4 is a schematic block diagram of one embodiment of the pre-filter module 305. As may be appreciated, certain sensors 120, such as IR sensors, have a dynamic range larger than 8 bits; however, the human eye can only perceive approximately 8 bits of visual information. Accordingly, the pre-filter module 305 may be used to extract 8-bit visual data from the raw image data 300. The pre-filter module 305 includes a histogram computation module 400 that forms an image histogram using the image data 300. An image content range computation module 405 uses the image histogram to calculate an image content range of the image data 300 (e.g., a dynamic range of the image data 300). Moreover, an image data dynamic range reduction module 410 uses the image content range to convert the image data 300 into reduced dynamic range image data, such as data with 8-bits of dynamic range. The pre-filter module 305 outputs the reduced dynamic range image data as filtered image data 415.

The following is one example of operation of the pre-filter module 305. In this example, I(x, y) represents raw image data 300 with a range of R, and h(u) represents an image histogram calculated from I(x, y) using the histogram computation module 400. For a given threshold level, η, the range of intensity values of image content is determined by the image content range computation module 405, such as by using Equations 2 and 3. Equation 2 may be used to calculate the minimum intensity values accounting for noise in the image, and Equation 3 may be used to calculate the maximum intensity values accounting for noise in the image.

$$I_{min}=a, a=\min\{u \in R: h(u) \geq \eta\} \quad \text{Equation 2}$$

$$I_{max}=b, b=\max\{u \in R: h(u) \geq \eta\} \quad \text{Equation 3}$$

The threshold level is used to remove noisy intensity values. To remove noisy intensity values, all intensity values less than $I_{min}$ are set to $I_{min}$ and all intensity values larger than $I_{max}$ are set to $I_{max}$. After removing noisy intensity values, the image data dynamic range reduction module 410 may convert the denoised raw image data 300 into 8-bit image data (e.g., the filtered image data 415) using Equation 4.

$$I_F(x, y) = 255 * \frac{I(x, y) - I_{min}}{I_{max} - I_{min}} \quad \text{Equation 4}$$

The filtered image data 415, $I_F(x, y)$, has a dynamic range of [0, 255] and contains the visual information of raw image I(x, y). Accordingly, the pre-filter module 305 may receive the image data 300 and output the filtered image data 415.

Figure 5:
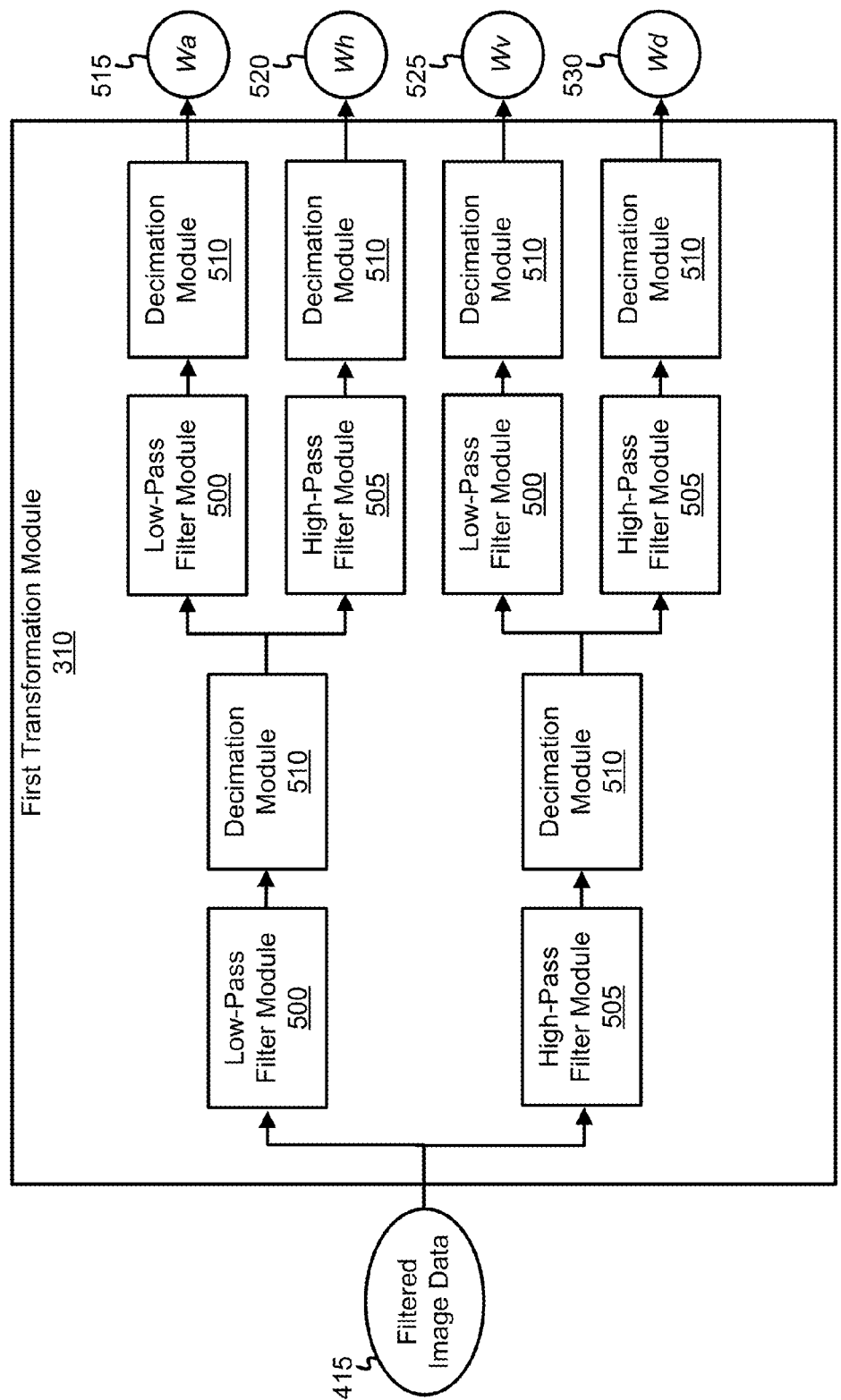
FIG. 5 is a schematic block diagram of a wavelet transformation module according to one embodiment.

FIG. 5 is a schematic block diagram of one embodiment of the wavelet transformation module 310. As may be appreciated, wavelet transformation is a tool that may be used to represent images, such as IR images, in terms of scale-space analysis. For example, for a given wavelet function, $\phi(t)$, the scale and translation of the function form a basis for $L^2$ (R) space. Thus, any function in $L^2$ (R) space may be represented by the wavelet basis as illustrated by Equations 5 and 6.

$$f(t) = \sum_{j=-\infty}^{\infty}\sum_{i=-\infty}^{\infty} <f(t), \varphi_{j,i}(t)> \varphi_{j,i}(t), \forall f(t) \in L^2(R) \quad \text{Equation 5}$$

$$\varphi_{j,i}(t) = \frac{1}{\sqrt{i}}\varphi\left(\frac{t-j}{i}\right) \quad \text{Equation 6}$$

Computationally, wavelet transformation, which is a projection onto a wavelet basis, may be implemented by an orthonormal filter bank, which is constructed using a low-pass filter module 500 and a high-pass filter module 505. The low-pass filter module 500 includes a low-pass filter h(n) calculated from a wavelet function (e.g., Equation 5). Moreover, the high-pass filter module 505 includes a high-pass filter g(n) calculated from the wavelet function (e.g., Equation 5). The functions g(n) and h(n) are the wavelet function and its scaling function. The wavelet transformation module 310 illustrates an embodiment of the first level of a two-dimensional (2D) wavelet transformation using a filter bank having the low-pass filter module 500 and the high-pass filter module 505.

Specifically, the filtered image data 415 (e.g., I(m, n)) is provided to the low-pass filter module 500 and to the high-pass filter module 505. From the low-pass filter module 500 and the high-pass filter module 505 data is provided to respective decimation modules 510. Each decimation module 510 decimates the data by a factor of 2. Data is output from the decimation modules 510 to additional low-pass filter modules 500 and high-pass filter modules 505. Furthermore, data is output from the low-pass filter modules 500 and high-pass filter modules 505 to additional respective decimation modules 510.

The decimation modules 510 output data in the wavelet domain. Specifically, image content is compactly represented in the low-frequency band, Wa 515; horizontal image edges are presented in the high-frequency band, Wh 520; vertical image edges are presented in the high-frequency band, Wv 525; and diagonal image edges are presented in the high-frequency band Wd 530. In certain embodiments, additional levels of the wavelet transform may be calculated using a duplicate of the wavelet transformation module 310, except that the filtered image data 415 is replaced with Wa 515, the low-frequency wavelet coefficients obtained from the previous level.

Figure 6:
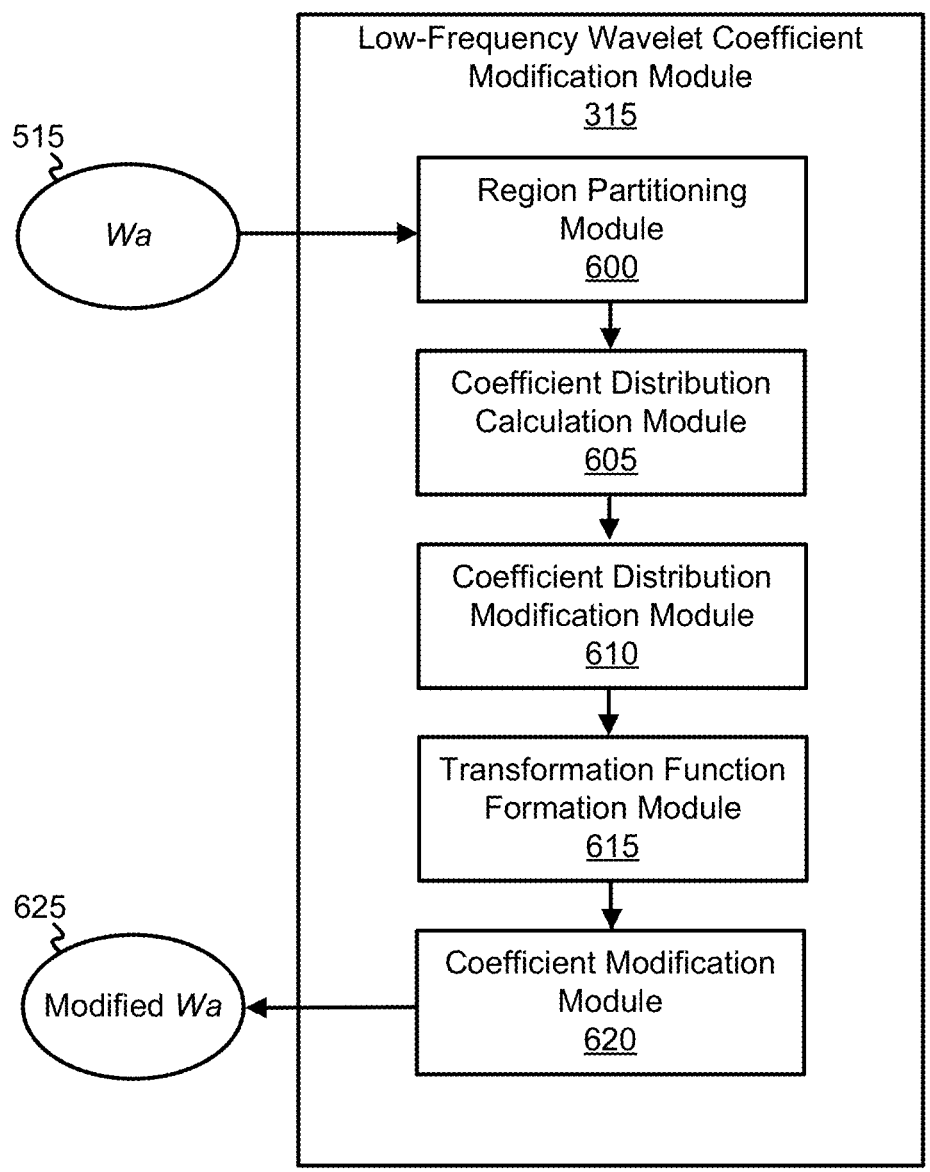
FIG. 6 is a schematic block diagram of a low-frequency wavelet coefficient modification module according to one embodiment.

FIG. 6 is a schematic block diagram of one embodiment of the low-frequency wavelet coefficient modification module 315. As may be appreciated, wavelet coefficients provide image edge information that enables enhanced image edges without edge detection and without increasing image noise. Because most image energy is in the low-frequency band, the low-frequency wavelet coefficient modification module 315 uses a local coefficient distribution based adaptive filtering to enhance wavelet coefficients in the low-frequency band.

Figure 7:
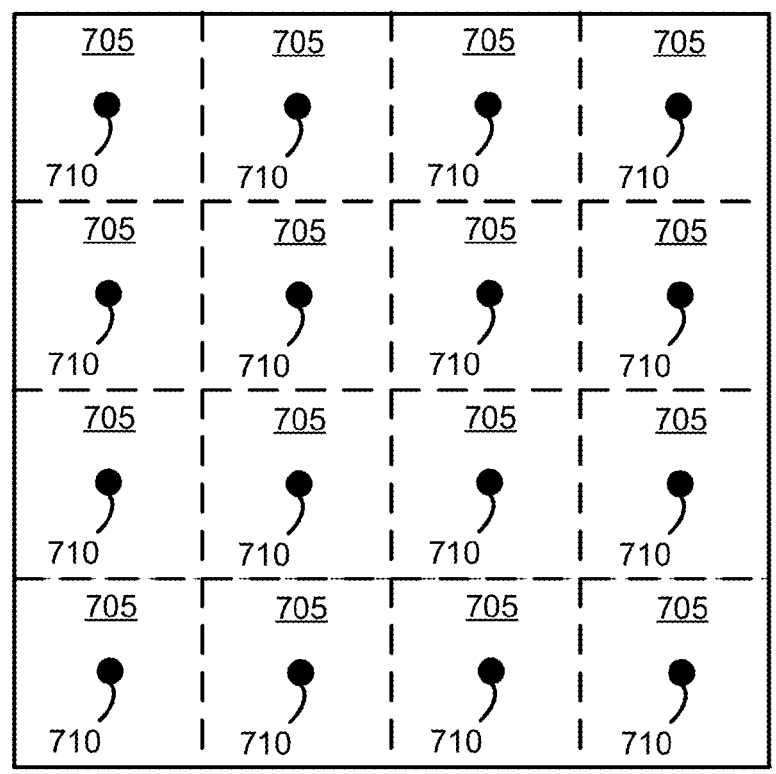
FIG. 7 is a schematic illustration of a wavelet coefficient image divided into regions according to one embodiment.
Figure 8:
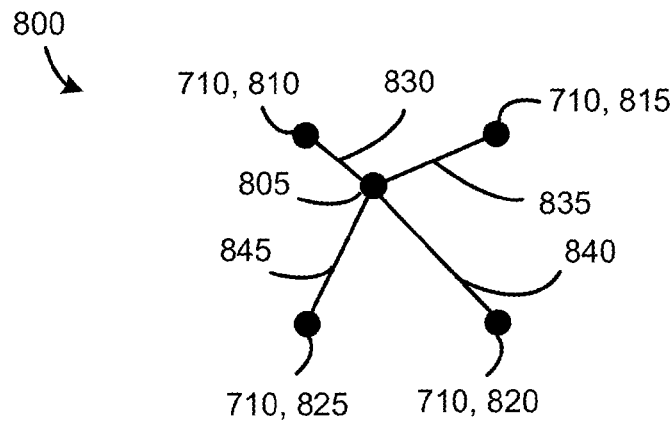
FIG. 8 is a schematic illustration of region centers that are used to determine a transformation function according to one embodiment.

Specifically, the wavelet coefficients Wa 515 are provided to a region partitioning module 600 that partitions the wavelet coefficients Wa 515 into multiple regions. A coefficient distribution calculation module 605 calculates a coefficient distribution for each region. Furthermore, a coefficient distribution modification module 610 modifies the coefficient distribution for each region. Moreover, a transformation function formation module 615 forms a coefficient transformation function for each region. A coefficient modification module 620 modifies the wavelet coefficients Wa 515 using the coefficient transformation functions to output a modified Wa 625. FIGS. 7 and 8 provide more specific details about certain embodiments of the low-frequency wavelet coefficient modification module 315 and are integrated into the description of FIG. 6.

FIG. 7 is an illustration of one embodiment of a wavelet coefficient image 700 divided into regions 705. As may be appreciated, dividing the wavelet coefficient image 700 into regions 705 may facilitate capturing local wavelet coefficient statistical structures. As illustrated, the wavelet coefficient image 700 is partitioned into many rectangular local regions 705. Specifically, FIG. 7 illustrates an example of 4×4 local region 705 partitions. However, in other embodiments, the wavelet coefficient image 700 may be partitioned into any suitable number of partitions, such as 2×2, 2×3, 2×7, 3×3, 5×5, 5×10, 10×10, and so forth. In one embodiment, the region partitioning module 600 of FIG. 6 may calculate partitioning the wavelet coefficient image (e.g., Wa 515) using Equations 7 and 8.

$$P=\{p_{ij}\}_{(i=1,j=1)}^{(m,n)} \qquad \text{Equation 7}$$

$$p_{ij}=\{Wa(x,y):(i-1)*B_x+1 \leq x \leq i*B_x, (j-1)*B_y+1 \leq y \leq j*B_y\} \qquad \text{Equation 8}$$

The constants $B_x$ and $B_y$ are the size of a local region in row and column, respectively. A center $c_{ij}$ of each region 705 may be determined by Equation 9.

$$c_{i,j} = \left[\left(i-\frac{1}{2}\right)*B_x, \left(j-\frac{1}{2}\right)*B_y\right] \qquad \text{Equation 9}$$

Returning to FIG. 6, the coefficient distribution calculation module 605 may calculate the wavelet coefficient distribution of each local region 705 by: calculating a histogram of each local region 705 and normalizing the histogram to obtain the coefficient distribution. Specifically, in one embodiment, for each local region $p_{ij}$ 705, the distribution may be calculated using Equations 10 and 11.

$$h_{ij}(k)=\text{histogram}(p_{ij}), k=1,2,\ldots,K \qquad \text{Equation 10}$$

$$prob_{i,j}(k) = \frac{h_{i,j}(k)}{\sum_{l=1}^{K} h_{i,j}(l)} \qquad \text{Equation 11}$$

The local region 705 distributions are used to construct local transformation functions that are able to convert local wavelet coefficients into a uniform distribution. As may be appreciated, in conventional histogram-based distribution modification techniques, histogram peak regions may cause over-stretching, in which image regions corresponding to the histogram peaks may cause too much distribution change. To reduce over-stretching in histogram peak regions, the coefficient distribution modification module 610 may use an adaptive thresholding technique to modify local wavelet coefficient distributions. In certain embodiments, modifying the distribution uses a threshold to cut off the distribution peaks and to redistribute the cutoff portion of the distribution into other bins. The threshold is adaptively determined by the maximal value of the local histogram. For a predefined ratio, r, the cutoff threshold may be calculated using Equations 12 and 13.

$$\text{thre}=r*\max\_h \qquad \text{Equation 12}$$

$$\max\_h=\max(h_{ij}) \qquad \text{Equation 13}$$

The number of total cutoff points may be calculated using Equation 14.

$$N_h = \sum_k (h_{i,j}(k) - \text{thre}), h_{i,j}(k) > \text{thre} \qquad \text{Equation 14}$$

Furthermore, the average number of redistribution points may be calculated using Equation 15.

$$dn = N_h/m \qquad \text{Equation 15}$$

The constant m is the number of bins that have their number of points less than the cutoff threshold. The modified histogram may be calculated using Equation 16.

$$h_{ij}^{md}(k) = \begin{cases} h_{i,j}(k) - \text{thre} & \text{if } h_{i,j}(k) > \text{thre} \\ h_{i,j}(k) + dn & \text{otherwise} \end{cases} \qquad \text{Equation 16}$$

For a probability density function, its accumulated probability density function may be used to convert the original probability density function into a uniform density function. In certain embodiments, the accumulated density function is used as the transformation function to convert the modified local distribution into a uniform distribution.

The transformation function formation module 615 calculates the accumulated density function from the modified histogram. Specifically, the probability density function may be calculated from the modified histogram using Equation 17.

$$prob_{i,j}(k) = \frac{h_{ij}^{md}(k)}{\sum_{l=1}^{K} h_{ij}^{md}(l)} \qquad \text{Equation 17}$$

With the density function from Equation 17, the transformation function may be calculated using Equation 18.

$$f_{i,j}(k) = \sum_{l=1}^{k} prob_{i,j}(l) \qquad \text{Equation 18}$$

The transformation function formation module 615 may calculate the transformation function for each partitioned local region 705.

The coefficient modification module 620 calculates a new value (e.g., modified Wa 625) for every wavelet coefficient (e.g., Wa 515) in the low-frequency band. In some embodiments, the transformation function for every coefficient is calculated by the interpolation of two or more transformation functions (e.g., four transformation functions) from the nearest region centers 710.

FIG. 8 is an illustration 800 of one embodiment of region centers 710 that may be used to determine the transformation function for every coefficient. Specifically, FIG. 8 illustrates a coefficient p 805 and four nearest partition centers, $c_1$ 810, $c_2$ 815, $c_3$ 820, and $c_4$ 825 each having a respective transformation function, $f_1$, $f_2$, $f_3$ and $f_4$.

To calculate the transformation function for the coefficient p 805, distances $d_1$ 830, $d_2$ 835, $d_3$ 840, and $d_4$ 845 from the coefficient p 805 to the four centers $c_1$ 810, $c_2$ 815, $c_3$ 820, and $c_4$ 825 may be calculated using Equation 19.

$$d_i = \|p - c_i\| = \sqrt{(x_p - x_{c_i})^2 + (y_p - y_{c_i})^2} \qquad \text{Equation 19}$$

With the distances $d_1$ 830, $d_2$ 835, $d_3$ 840, and $d_4$ 845, a weight factor that measures the contribution to the function interpolation from each center's transformation function may be calculated. In one embodiment, the weight factor may be calculated using Equation 20.

$$w_i = \frac{q_i}{\sum_{j=1}^{4} q_j}, \text{ and } q_i = \frac{1}{d_i} \qquad \text{Equation 20}$$

Furthermore, the transformation function for the coefficient p 805, may be calculated using Equation 21.

$$f_p(u) = \begin{cases} \sum_{i=1}^{4} w_i f_i(u) & \text{if } d_i \neq 0 \\ f_i(u) & \text{if } d_i = 0 \end{cases} \qquad \text{Equation 21}$$

If the value of coefficient p 805 is a, the new value of the coefficient p 805 may be given by Equation 22.

$$a_{new} = f_p(a) \qquad \text{Equation 22}$$

After the transformation of every coefficient, the wavelet coefficients in the low-frequency band (e.g., modified Wa 625) may have a distribution close to the uniform distribution.

Figure 9:
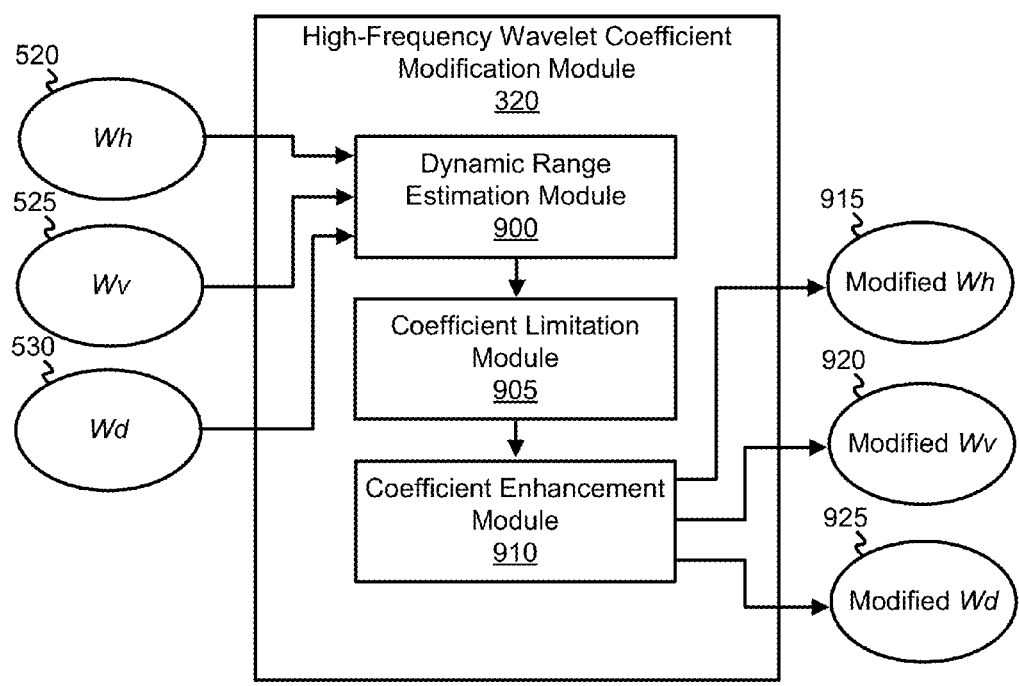
FIG. 9 is a schematic block diagram of a high-frequency wavelet coefficient modification module according to one embodiment.

FIG. 9 is a schematic block diagram of one embodiment of the high-frequency wavelet coefficient modification module 320. In certain embodiments, the high-frequency wavelet coefficient modification module 320 may apply an adaptive thresholding technique in the three high-frequency bands to enhance the wavelet coefficients that represent image edges. As may be appreciated, wavelet coefficients in the three high-frequency bands contain edge information. Specifically, Wh 520 contains horizontal edge information, Wv 525 contains vertical edge information, and Wd 530 contains diagonal edge information. Edge information may be used to enhance the visibility of objects in an image.

The high-frequency wavelet coefficient modification module 320 includes a dynamic range estimation module 900 that estimates the dynamic ranges of the wavelet coefficients. Furthermore, the high-frequency wavelet coefficient modification module 320 includes a coefficient limitation module 905 that removes noisy data points by limiting each wavelet coefficient to a threshold. Moreover, the high-frequency wavelet coefficient modification module 320 includes a coefficient enhancement module 910 that enhances each wavelet coefficient indicative of object edges using a local window-based technique. Each set of wavelet coefficients Wh 520, Wv 525, and Wd 530 are processed by the high-frequency wavelet coefficient modification module 320 to output a modified Wh 915, a modified Wv 920, and a modified Wd 925.

The following example uses the wavelet coefficients Wh 520 to illustrate how each set of wavelet coefficients is processed by the high-frequency wavelet coefficient modification module 320. Accordingly, any equation that references Wh 520 could use another set of wavelet coefficients (e.g., Wv 525 and Wd 530) instead.

Thus, in an example using the wavelet coefficients Wh 520, the dynamic range estimation module 900 may calculate the dynamic range of Wh 520 using Equation 23.

$$\max\_wh = \max(Wh) \qquad \text{Equation 23}$$

Furthermore, the coefficient limitation module 905 may calculate a threshold with a pre-determined ratio r_wh using Equation 24.

$$\text{thre}\_wh = r\_wh * \max\_wh \qquad \text{Equation 24}$$

Moreover, the coefficient limitation module 905 may set the coefficients with values less than thre_wh to zero using Equation 25.

$$Wh^{md}(p) = \begin{cases} Wh^{md}(p) & \text{if } Wh^{md}(p) > 0 \\ 0 & \text{otherwise} \end{cases} \qquad \text{Equation 25}$$

The coefficient enhancement module 910 enlarges a non-zero point p by a scale factor using Equation 26.

$$Wh^{md}(p) = s * \max\_\text{local}, \text{ and } \max\_\text{local} = \max(N_p) \qquad \text{Equation 26}$$

$N_p$ is a neighborhood around the point p. The constant s is a pre-determined scale. In certain embodiments, $N_p = 5 \times 5$ and s=1.2 to 1.5. However, in other embodiments, $N_p$ and s may be any suitable values.

Figure 10:
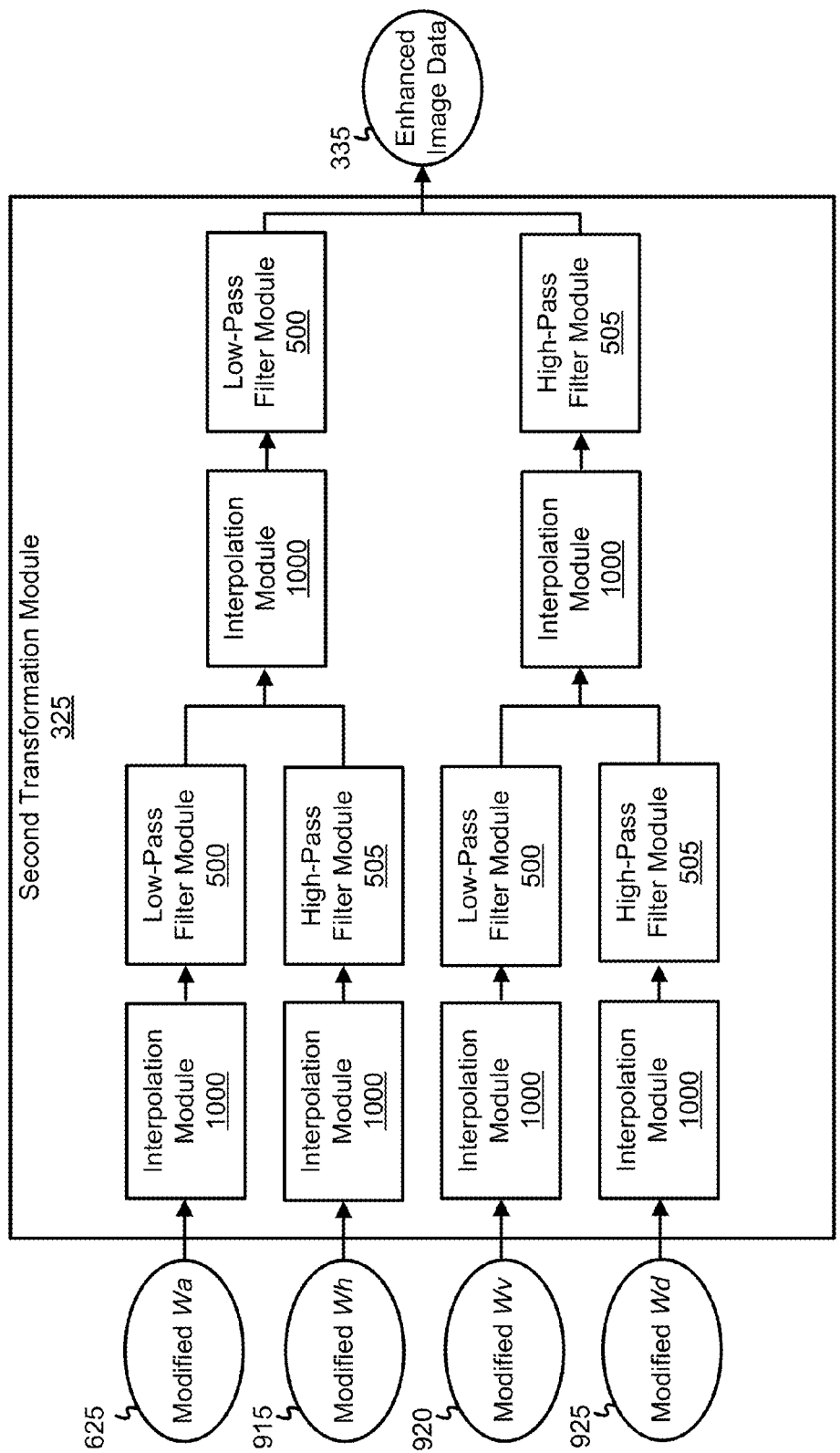
FIG. 10 is a schematic block diagram of an inverse wavelet transformation module according to one embodiment.

FIG. 10 is a schematic block diagram of one embodiment of the inverse wavelet transformation module 325. After enhancing the wavelet coefficients Wa 515, Wh 520, Wv 525, and Wd 530 to the modified Wa 625, modified Wh 915, modified Wv 920, and modified Wd 925, an inverse wavelet transformation is used to transform the wavelet coefficients from the wavelet domain to the intensity domain. The inverse wavelet transformation module 325 illustrates an embodiment of the first level of a 2D inverse wavelet transform with using a filter bank having the low-pass filter module 500 and the high-pass filter module 505.

Specifically, the modified Wa 625, modified Wh 915, modified Wv 920, and modified Wd 925 are provided to separate interpolation modules 1000. Each interpolation module 1000 interpolates the data by a factor of 2. Data is output form the interpolation modules 1000 to low-pass filter modules 500 and to high-pass filter modules 505. Furthermore, data is output from the low-pass filter modules 500 and the high-pass filter modules 505 to additional interpolation modules 1000, and then to a final low-pass filter module 500 and a final high-pass filter module 505. The final low-pass filter module 500 and the final high-pass filter module 505 output the enhanced image data 335.

To invert a multi-level wavelet transform, start with the highest level of the transform, perform the same calculation shown in FIG. 10. The output will be modified Wa 625 of the next (lower) level, which will be the input (along with modified Wh 915, modified Wv 920, and modified Wd 925) of the next stage. The process is repeated until all of the levels have been inversely transformed and the intensity image is obtained.

Figure 11:
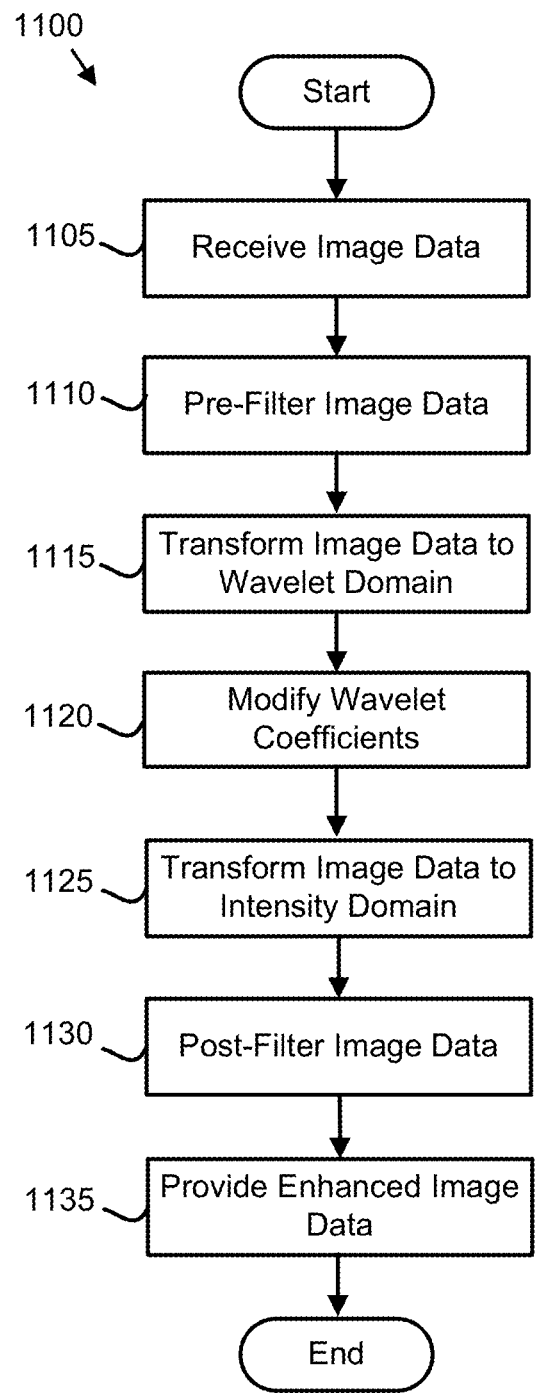
FIG. 11 is a schematic flow diagram of a method of enhancing image data according to one embodiment.

FIG. 11 is a schematic flow diagram of one embodiment of a method 1100 for enhancing image data. The method 1100 may include receiving 1105 image data (e.g., image data 300), such as receiving 1105 image data from a platform, apparatus, or system. In certain embodiments, the image data may be infrared data captured by an infrared sensor. The method 1100 also may include pre-filtering 1110 the image data to remove data outside of a predetermined range.

Furthermore, the method 1100 may include transforming 1115 the image data from an intensity domain to a wavelet domain to produce wavelet coefficients. A first set of wavelet coefficients may include low-frequency wavelet coefficients (e.g., Wa 515), and a second set of wavelet coefficients may include high-frequency wavelet coefficients (e.g., Wh 520, Wv 525, and Wd 530). Transforming 1115 the image data from the intensity domain to the wavelet domain may include using one or more low-pass filters, using one or more high-pass filters, and/or decimating the image data.

Moreover, the method 1100 may include modifying 1120 the first and/or second set of wavelet coefficients. In certain embodiments, modifying 1120 the first set of wavelet coefficients includes using a coefficient distribution based filter to produce a modified first set of wavelet coefficients. Furthermore, modifying 1120 the first set of wavelet coefficients may include partitioning the first set of wavelet coefficients into multiple regions, calculating a coefficient distribution for each region, modifying the coefficient distribution for each region, forming a coefficient transformation function for each region, and modifying the first set of wavelet coefficients using the coefficient transformation functions.

In some embodiments, calculating the coefficient distribution for each region includes computing a histogram for each region and normalizing the histogram for each region. Moreover, modifying the coefficient distribution for each region may include using a threshold value to limit a distribution peak of the coefficient distribution for each region and redistributing coefficients limited by the distribution peak.

In certain embodiments, modifying the first set of wavelet coefficients using the coefficient transformation function includes, for each wavelet coefficient of the first set of wavelet coefficients, using at least two coefficient transformation functions each corresponding to a respective central point of the at least two regions. In some embodiments, the two central points may be the closest central points to the wavelet coefficient. Moreover, using at least two coefficient transformation functions may include using a weight factor for each of the two coefficient transformation functions. Each weight factor may be calculated based on a distance between the wavelet coefficient and one of the two central points.

In some embodiments, modifying 1120 the second set of wavelet coefficients includes modifying the second set of wavelet coefficients to enhance image edges and to produce a modified second set of wavelet coefficients.

The method 1100 may also include transforming 1125 the modified first and/or second sets of wavelet coefficients from the wavelet domain to the intensity domain to produce enhanced image data. In certain embodiments, transforming 1125 the modified first and/or second sets of wavelet coefficients from the wavelet domain to the intensity domain includes using one or more low-pass filters, one or more high-pass filters, and/or interpolating the modified first and/or second sets of wavelet coefficients.

Moreover, the method 1100 may include post-filtering 1130 the enhanced image data using a smoothing filter to remove blocking artifacts from the enhanced image data. Furthermore, the method 1100 may include providing 1135 the enhanced image data, such as to a display device (e.g., display device 215).

Figure 12A:
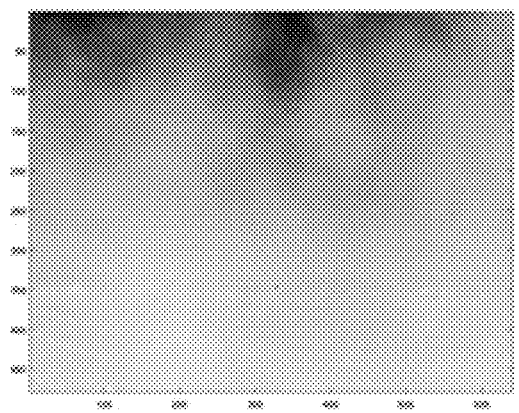
FIG. 12A is an image showing image data received by an image sensor according to one embodiment.
Figure 12B:
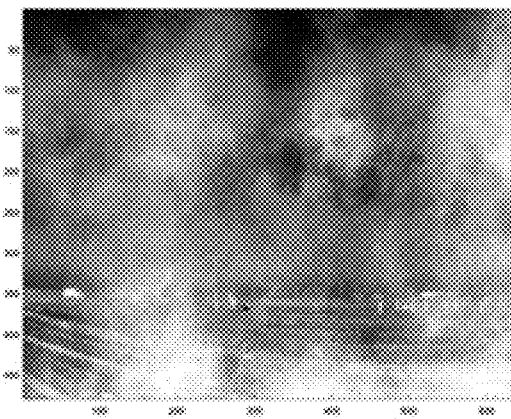
FIG. 12B is an enhanced image showing enhanced image data output from the image processing module of FIG. 3 using the image data from FIG. 12A according to one embodiment.

FIG. 12A is an image 1200 showing image data 300 received by an image sensor in one embodiment. Moreover, FIG. 12B is an enhanced image 1205 showing enhanced image data 335 output from the image processing module 220 of FIG. 3 using the image data 300 from FIG. 12A. As can be seen by comparing FIGS. 12A and 12B, the image processing module 220 may provide enhanced image data 335 using the image data 300 as input.

Figure 13A:
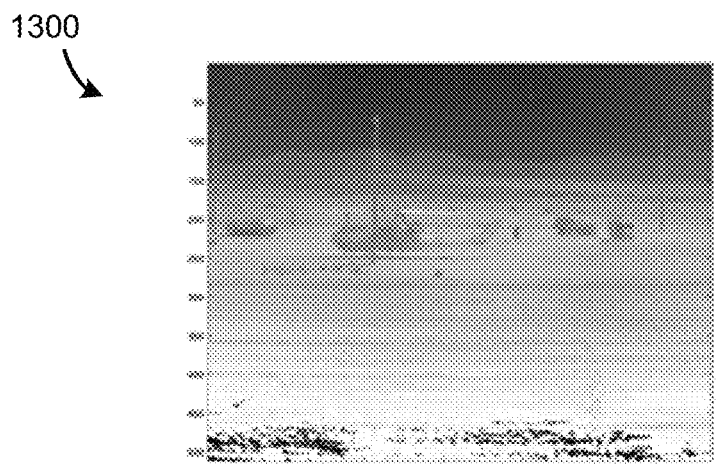
FIG. 13A is an image showing image data received by an image sensor according to another embodiment.
Figure 13B:
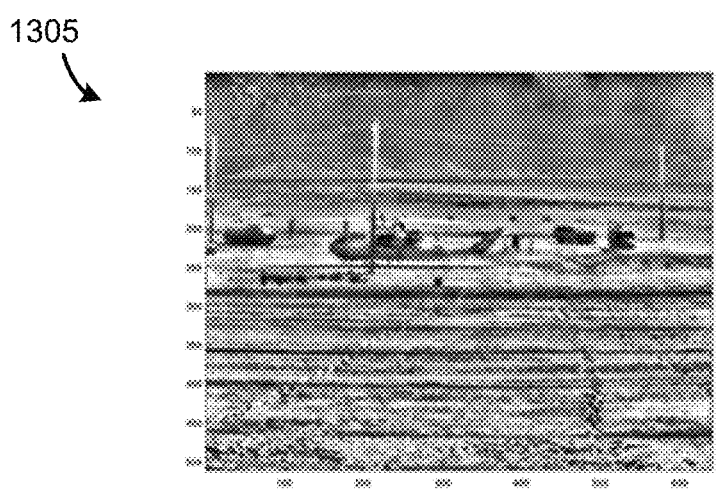
FIG. 13B is an enhanced image showing enhanced image data output from the image processing module of FIG. 3 using the image data from FIG. 13A according to one embodiment.

FIG. 13A is an image 1300 showing image data 300 received by an image sensor according to another embodiment. Furthermore, FIG. 13B is an enhanced image 1305 showing enhanced image data 335 output from the image processing module 220 of FIG. 3 using the image data 300 from FIG. 13A. As can be seen by comparing FIGS. 13A and 13B, the image processing module 220 may provide enhanced image data 335 using the image data 300 as input.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Embodiments of the image processing module 220 may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

The image processing module 220 may be implemented as a hardware circuit comprising custom VLSI circuits or gate arrays, off-the-shelf semiconductors such as logic chips, transistors, or other discrete components. The image processing module 220 may also be implemented in programmable hardware devices such as field programmable gate arrays, programmable array logic, programmable logic devices or the like.

The image processing module 220 may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized by the image processing module 220. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A method of enhancing image data, comprising:
   transforming image data from an intensity domain to a wavelet domain to produce a plurality of wavelet coefficients, wherein a first set of wavelet coefficients of the plurality of wavelet coefficients comprises low-frequency wavelet coefficients;
   modifying the first set of wavelet coefficients using a coefficient distribution based filter to produce a modified first set of wavelet coefficients, wherein modifying the first set of wavelet coefficients using the coefficient distribution based filter comprises partitioning the first set of wavelet coefficients into a plurality of regions, calculating a coefficient distribution for each region of the plurality of regions, modifying the coefficient distribution for each region, forming a coefficient transformation function for each region, and modifying the first set of wavelet coefficients using the coefficient transformation functions; and transforming the modified first set of wavelet coefficients from the wavelet domain to the intensity domain to produce enhanced image data.

2. The method of claim 1, wherein transforming the image data from the intensity domain to the wavelet domain comprises using one or more low-pass filters and one or more high-pass filters to filter the image data.

3. The method of claim 2, wherein transforming the image data from the intensity domain to the wavelet domain comprises decimating the image data.

4. The method of claim 1, wherein calculating the coefficient distribution for each region of the plurality of regions comprises computing a histogram for each region of the plurality of regions and normalizing the histogram for each region.

5. The method of claim 1, wherein modifying the coefficient distribution for each region comprises using a threshold value to limit a distribution peak of the coefficient distribution for each region and redistributing a number of coefficients limited by the distribution peak.

6. The method of claim 1, wherein modifying the first set of wavelet coefficients using the coefficient transformation functions comprises, for each wavelet coefficient of the first set of wavelet coefficients, using at least two coefficient transformation functions each corresponding to a respective central point of at least two regions, wherein the at least two central points are central points closest to the wavelet coefficient.

7. The method of claim 6, wherein using the at least two coefficient transformation functions comprises using a weight factor for each of the at least two coefficient transformation functions, wherein each weight factor is calculated based on a distance between a position of the wavelet coefficient and a position of one of the at least two central points.

8. The method of claim 1, wherein a second set of wavelet coefficients of the plurality of wavelet coefficients comprises high-frequency wavelet coefficients.

9. The method of claim 8, further comprising modifying the second set of wavelet coefficients to enhance image edges and remove noise and to produce a modified second set of wavelet coefficients.

10. The method of claim 1, wherein transforming the modified first set of wavelet coefficients from the wavelet domain to the intensity domain comprises using one or more low-pass filters and one or more high-pass filters to filter the modified first set of wavelet coefficients, and interpolating the modified first set of wavelet coefficients.

11. The method of claim 1, further comprising filtering the image data to convert data into a predetermined dynamic range using a histogram of the image data before transforming the image data from the intensity domain to the wavelet domain.

12. The method of claim 1, wherein the image data comprises infrared data captured by an infrared sensor.

13. The method of claim 1, further comprising removing blocking artifacts from the enhanced image data using a smoothing filter.

14. A mobile platform, comprising:
a sensor configured to detect an image and to produce image data associated with the image;
a processor operatively coupled to the sensor and configured to receive the image data; and
a non-transitory memory that stores code executable by the processor, the code comprising:
code that transforms the image data from an intensity domain to a wavelet domain to produce first, second, third, and fourth sets of wavelet coefficients, the first set of wavelet coefficients comprising low-frequency wavelet coefficients, and the second, third, and fourth sets of wavelet coefficients comprising high-frequency wavelet coefficients;
code that modifies the first set of wavelet coefficients using a coefficient distribution based filtering to produce a modified first set of wavelet coefficients, wherein the code that modifies the first set of wavelet coefficients using the coefficient distribution based filtering comprises code that partitions the first set of wavelet coefficients into a plurality of regions, calculates a coefficient distribution for each region of the plurality of regions, modifies the coefficient distribution for each region, forms a coefficient transformation function for each region, and modifies the first set of wavelet coefficients using the coefficient transformation functions;
code that modifies the second, third, and fourth sets of wavelet coefficients to enhance image edges and to produce modified second, third, and fourth sets of wavelet coefficients; and
code that transforms the modified first, second, third, and fourth sets of wavelet coefficients from the wavelet domain to the intensity domain to produce enhanced image data.

15. The mobile platform of claim 14, wherein the sensor comprises an infrared image sensor.

16. The mobile platform of claim 14, further comprising a display device operatively coupled to the processor and configured to display the enhanced image data.

17. An apparatus, comprising:
a wavelet transformation module that transforms image data from an intensity domain to a wavelet domain to produce a plurality of wavelet coefficients, wherein a first set of wavelet coefficients of the plurality of wavelet coefficients comprises low-frequency wavelet coefficients, and a second set of wavelet coefficients of the plurality of wavelet coefficients comprises high-frequency wavelet coefficients;
a low-frequency wavelet coefficient modification module that modifies the first set of wavelet coefficients using a coefficient distribution based filter to produce a modified first set of wavelet coefficients, wherein the low-frequency wavelet coefficient modification module modifies the first set of wavelet coefficients using the coefficient distribution based filtering by partitioning the first set of wavelet coefficients into a plurality of regions, calculating a coefficient distribution for each region of the plurality of regions, modifying the coefficient distribution for each region, forming a coefficient transformation function for each region, and modifying the first set of wavelet coefficients using the coefficient transformation functions;
a high-frequency wavelet coefficient modification module that modifies the second set of wavelet coefficients to enhance image edges and to produce a modified second set of wavelet coefficients, wherein a modified plurality of wavelet coefficients comprises the modified first and second sets of wavelet coefficients;

an inverse wavelet transformation module that transforms the modified plurality of wavelet coefficients from the wavelet domain to the intensity domain to produce enhanced image data; and a post-filter module that removes blocking artifacts from the enhanced image data using a smoothing filter;

wherein at least one of the wavelet transformation module, the low-frequency wavelet coefficient modification module, the high-frequency wavelet coefficient modification module, the inverse wavelet transformation module, and the post-filter module comprises one or more of hardware and executable code, the executable code stored on one or more non-transitory computer readable storage media.

18. The apparatus of claim 17, wherein the high-frequency wavelet coefficient modification module modifies the second set of wavelet coefficients to enhance image edges and to produce a modified second set of wavelet coefficients by estimating a dynamic range of the second set of wavelet coefficients, removing noisy data points by limiting each wavelet coefficient of the second set of wavelet coefficients to a threshold, and enhancing each wavelet coefficient of the second set of wavelet coefficients being indicative of object edges.

19. The apparatus of claim 17, further comprising a pre-filter module that filters the image data before the wavelet transformation module transforms the image data from the intensity domain to the wavelet domain by forming an image histogram using the image data, calculating an image content range using the image histogram, and converting the image data into reduced dynamic range image data using the image content range.

\* \* \* \* \*